United States Patent [19]

Staffel et al.

[11] Patent Number: 5,043,151

[45] Date of Patent: Aug. 27, 1991

[54] PROCESS FOR PRODUCING AMMONIUM POLYPHOSPHATE WHICH GIVES A LOW-VISCOSITY AQUEOUS SUSPENSION

[75] Inventors: Thomas Staffel; Renate Adrian, both of Hürth, Fed. Rep. of Germany

[73] Assignee: Hoechst Aktiengesellschaft, Frankfurt am Main, Fed. Rep. of Germany

[21] Appl. No.: 555,931

[22] Filed: Jul. 20, 1990

[30] Foreign Application Priority Data

Aug. 3, 1989 [DE] Fed. Rep. of Germany ....... 3925675

[51] Int. Cl.$^5$ .................... C01B 15/16; C01B 25/26; C05B 11/00
[52] U.S. Cl. .................................. 423/305; 423/315
[58] Field of Search ............... 423/305, 307, 308, 311, 423/314, 315; 71/43

[56] References Cited

U.S. PATENT DOCUMENTS

| | | | |
|---|---|---|---|
| 3,978,195 | 8/1976 | Schrödter et al. | 423/305 |
| 4,687,651 | 8/1987 | Parker et al. | 423/305 |
| 4,832,928 | 5/1989 | Parker et al. | 423/305 |

Primary Examiner—Gregory A. Heller

[57] ABSTRACT

A process for producing essentially water-insoluble, chain-type ammonium polyphosphates of the general formula $(NH_4PO_3)_n$, in which n is a number from 10 to 1,000, whose 20% by weight aqueous suspension prepared at 60° C. has a viscosity of less than 100 mPa.s at 20° C., is indicated, which comprises allowing a reaction mixture of ammonium orthophosphate and phosphorus pentoxide to react fully at a high mixing intensity in a crumbly phase at a temperature from 100° to 300° C. over a period of from 10 to 60 minutes and then heat-treating the reaction material in a known manner over a period of from 50 to 200 minutes at a temperature from 200° to 300° C. under an ammonia atmosphere.

Advantageously, the reaction is carried out in a kneader.

14 Claims, 2 Drawing Sheets

PROCESS FOR PRODUCING AMMONIUM POLYPHOSPHATE WHICH GIVES A LOW-VISCOSITY AQUEOUS SUSPENSION

The invention relates to a process for producing essentially water-insoluble, chain-type ammonium polyphosphates of the general formula $(NH_4PO_3)_n$, in which n is a number from 10 to 1,000, by heating ammonium orthophosphate and phosphorus pentoxide in the presence of gaseous ammonia with simultaneous agitation of the reaction material.

According to U.S. Pat. No. 3,978,195, ammonium polyphosphate can be produced by heating approximately equivalent quantities of ammonium orthophosphate and phosphorus pentoxide to temperatures between 170 and 350° C. in the presence of gaseous ammonia. The heating is carried out with continuous and simultaneous mixing, kneading and comminution of the reaction material in such a way that, during the first heating phase, the reactants are converted in the pasty state at a low mixing intensity and aftertreated in a downstream heat-treatment phase at a high mixing intensity in kind of fluidized bed.

The ammonium polyphosphate produced in this way is an essentially water-insoluble, chain-type ammonium polyphosphate of the general formula $(NH_4PO_3)_n$, in which n is a number from 10 to 1,000.

In various applications, this ammonium polyphosphate has the disadvantage that it forms a high-viscosity gel in aqueous phase.

It was therefore the object to produce an ammonium polyphosphate which, on the one hand, is essentially water-insoluble but, on the other hand, does not form a high-viscosity gel in aqueous phase.

Surprisingly, it has now been found that the production of an ammonium polyphosphate which gives a low-viscosity aqueous suspension succeeds, by the known process according to U.S. Pat. No. 3,978,195, if the operating procedure is modified to a substantial extent.

The operating procedure according to the invention comprises, for producing an ammonium polyphosphate whose 20% by weight aqueous suspension prepared at 60° C. has a viscosity of less than 100 mPa.s at 20° C, allowing a reaction mixture of ammonium orthophosphate and phosphorus pentoxide to react fully at a high mixing intensity in a crumbly phase at a temperature from 100 to 300° C, preferably from 150 to 280° C, over a period of from 10 to 60 minutes, preferably from 20 to 30 minutes, and then heat-treating the reaction material in a known manner for 100 to 120 minutes at a temperature from 200 to 300° C, preferably from 250 to 280° C, under an ammonia atmosphere.

Furthermore, if desired, the process according to the invention can also be further developed by a) using diammonium orthophosphate as the ammonium orthophosphate;

b) using a molar ratio of $P_2O_5$: $(NH_4)_xH_{3-x}PO_4 = 1 : 0.3$ to 1 in the reaction mixture;

c) admixing 0.1 to 0.5 kg of urea per 1 kg of phosphorus pentoxide to the reaction mixture;

d) carrying out the process in a kneader reactor;

e) sizing the heat-removal surface areas of the kneader reactor such that the reaction mixture is held at an end temperature of at most 300° C;

f) preheating the reaction mixture to an initial reaction temperature from 130 to 170° C, preferably 140 to 160° C:

g) diluting the reaction mixture with up to 50% by weight of finished product;

h) carrying out the heat treatment of the reaction material, after a comminution step to a mean particle size of from 50 to 200 μm, at temperatures from 200 to 300° C. under an ammonia atmosphere; and i) carrying out the heat treatment in a rotary kiln.

The ammonium polyphosphate according to the invention is particularly suitable for incorporation as a flameproofing agent into intumescent paints, thermoplastics, PU foams and chipboard.

Especially for the use in intumescent paints, the rheological behavior of the suspension is of decisive importance. An unduly high viscosity of the intumescent paint due to gel-forming ammonium polyphosphate entails process engineering difficulties which can be overcome only by incorporating little flameproofing agent into the intumescent paint. In this case, several intumescent paint coats must then be applied for effective flameproofing.

This difficulty disappears when the ammonium polyphosphate produced according to the invention is used.

The process according to the invention now provides an ammonium polyphosphate which gives a low-viscosity aqueous suspension, is largely water-insoluble and can be produced at low cost from inexpensive starting materials.

The critical points for the process are to adhere to a short reaction time in the reaction of phosphorus pentoxide, ammonium orthophosphate and ammonia, and good removal of the heat of the reaction, it being necessary to ensure that the reaction mixture is not heated above a temperature of 300° C.

This space-time yield of the kneader reactor can also be increased by feeding further reaction mixture into the kneader reactor towards the end of the reaction phase. The following apparatus types were successfully tested as a kneader reactor:

1) Twin-shaft reactor made by Linden, Marienheide, type K2N-10; heat exchange area 1,500 cmz; reaction volume 7.5 liters.

2) Single-shaft kneader reactor made by Krauss-Maffei, Munich, Reactotherm type; heat exchange area 2,800 cm²; reaction volume 5 liters.

3) Eccentric mixer made by Hobart, Offenburg, type A 200; heat exchange area 4,120 cm²; reaction volume 25 liters.

BRIEF DESCRIPTION OF THE DRAWING

The X-ray diagram of the ammonium polyphosphate according to the invention is attached as FIG. 1, and the X-ray diagram of the ammonium polyphosphate produced according to U.S. Pat. No. 3,978,195 (now Comparison Example 1) is attached as FIG. 2.

Determination of the pH value and acid number 10 g of ammonium polyphosphate are suspended in 150 g of water. The pH value is measured by means of a glass electrode. The acid number is determined by titration with 0.1 N KOH to pH = 7.

Determination of the viscosity

The viscosity was measured by the disk system, cf. G. Schramm, Einfuhrung in praktische Viskosimetrie [Introduction to viscometry practice], 4th edition, Karlsruhe 1987, Verlag Gebr. Haake.

Before the determination of the viscosity, water was first heated to 60° C. and, using this, a 20% by weight suspension was then prepared by stirring in ammonium polyphosphate. After cooling to 20° C, the viscosity of the suspension was determined using a Brookfield viscometer.

The examples which follow are intended to explain the process according to the invention in yet more detail.

COMPARISON EXAMPLE 1

Example 1 of U.S. Pat. No. 3,978,195 was repeated.

Figure 2:
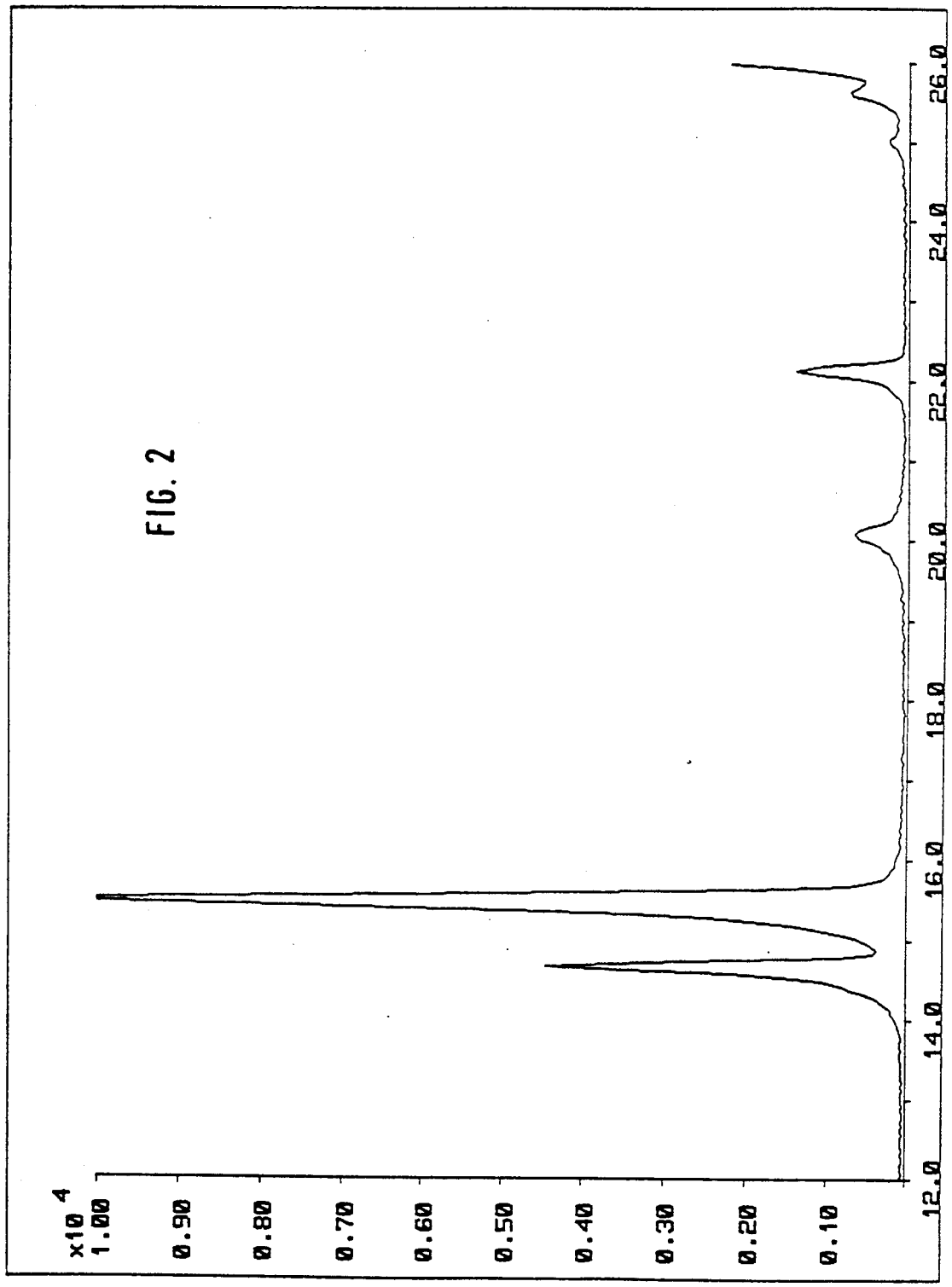

A mixture of 2,640 g of finely disperse $(NH_4)_2HPO_4$ and 2,840 g of finely disperse $P_4O_{10}$ was filled into a twinshaft mixer heated to 150° C, made by Linden, type K2N-10, with sigma-shaped kneading blades, and 400 liters of $NH_3$ were introduced for 1 hour and 100 liters of $NH_3$ for a further hour. The twin-shaft mixer ran at a speed of 30 rpm in the 1st hour. After 1 hour, the speed was increased to 150 rpm. The X-ray diagram of the ammonium polyphosphate obtained is shown in FIG. 2.

The product values are to be found in the table.

EXAMPLE 2

A mixture of 1,160 g of finely disperse $(NH_4)_2HPO_4$ and 1,220 g of finely disperse $P_4O_{10}$ are fed into the type K2N-10 twin-shaft mixer running at 150 rpm and heated up to 150° C. After introducing the ammonia, the reaction starts very suddenly. The reaction mixture thus heats up to 280° C. The reaction mixture changes into a crumbly state. After 20 minutes, the crumbly state changes to a pulverulent state. The reaction mixture is then also heat-treated for a further 100 minutes at 280 to 250° C.

Figure 1:
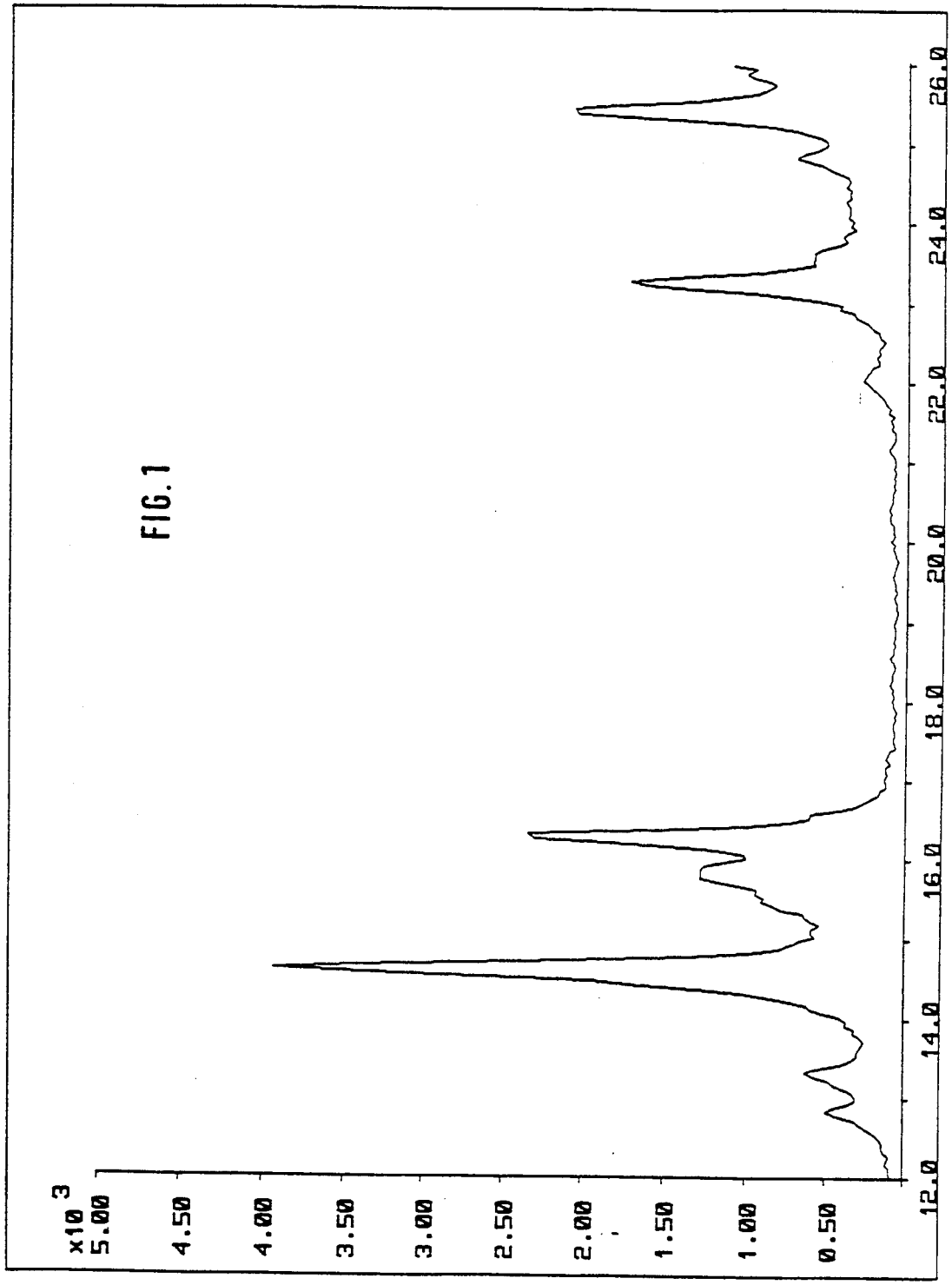

The X-ray diagram of the ammonium polyphosphate obtained is shown in FIG. 1.

The product values are noted in the table.

EXAMPLE 3

A mixture of 1,320 g of finely disperse $(NH_4)_2HPO_4$ and 1,420 g of finely disperse $P_4O_{10}$ is fed into an eccentric mixer made by Hobart, type A 200, running at 70/280 rpm. After introducing ammonia, the reaction starts rapidly. The reaction mixture thus heats up to 250° C. and at the same time changes into a crumbly state. After a reaction time of 25 minutes, the coarse granules are taken out of the eccentric mixer, ground in a mill to a mean particle diameter of 50 to 200 μm and heat-treated for 100 minutes in a rotary kiln at 280° C.

The product values are summarized in the table.

EXAMPLE 4

A mixture of 800 g of finely disperse $(NH_4)_2HPO_4$, 1,000 g of finely disperse $P_4O_{10}$ and 210 g of urea is fed into the type K2N-10 twin-shaft mixer running at 150 rpm and heated up to 150° C. After introducing the ammonia, the reaction mixture heats up to 295° C, with strong turbulence of the reaction mixture. The power consumption of the twin-shaft mixer rose sharply and remained high for a period of 10 minutes. After this period, the power consumption fell and the reaction product changed from the crumbly state to a pulverulent state. The reaction product was then also heat-treated for 100 minutes at 280° C.

The product values are included in the table.

EXAMPLE 5

A mixture of 1,160 g of finely disperse $(NH_4)_2HPO_4$, 1,250 g of finely disperse $P_4O_{10}$ and 500 g of finely disperse finished product from Example 2 are fed into the finished type K2N-10 twin-shaft mixer running at 150 rpm and heated up to 150° C. After introducing the ammonia, the reaction mixture heats up to 240° C. The reaction mixture remains in a pulverulent state, but the particle size increases in the initial reaction phase due to the formation of agglomerates.

After a reaction time of 20 minutes, the agglomerates change into a finely disperse solid. The product is also heat-treated for 100 minutes at 280 to 260° C.

The product values are compiled in the table.

TABLE

| Example No. | 1 | 2 | 3 | 4 | 5 |
| --- | --- | --- | --- | --- | --- |
| pH value | 5.1 | 6.6 | 6.6 | 4.9 | 6.7 |
| Acid number (mg of KOH/g) | 0.75 | 0.2 | 0.1 | 2.5 | 0.2 |
| Water-soluble constituents (%) | 3.4 | 3.4 | 4.1 | 3.4 | 3.4 |
| Viscosity mPa.s | 800 | 50 | 77 | 55 | 30 |

We claim:

1. A process for producing an essentially water-insoluble, chain-type ammonium polyphosphate of the general formula $(NH_4PO_3)_n$, in which n is a number from 10 to 1,000, by heating ammonium orthophosphate and phosphorus pentoxide in the presence of gaseous ammonia with simultaneous agitation of the reaction material, which comprises, for producing an ammonium polyphosphate whose 20% by weight aqueous suspension prepared at 60° C. has a viscosity of less than 100 mPa.s at 20° C, allowing the reaction mixture of ammonium orthophosphate and phosphorus pentoxide to react fully in a crumbly phase at a temperature from 100 to 300° C. over a period of from 10 to 60 minutes and then heat-treating the reaction material over a period of from 50 to 200 minutes at a temperature from 200 to 300° C. under an ammonia atmosphere.

2. The process as claimed in claim 1, wherein the reaction mixture is allowed to react fully at a temperature from 150 to 280° C. in a twin-shaft mixer running at 150 rpm over a period of from 20 to 30 minutes.

3. The process as claimed in claim 1, wherein the reaction material is heat-treated for a period of from 100 to 120 minutes under an ammonia atmosphere.

4. The process as claimed in claim 1, wherein the reaction material is heat-treated at a temperature from 250 to 280° C. under an ammonia atmosphere.

5. The process as claimed in claim 1, wherein diammonium orthophosphate is used as the ammonium orthophosphate.

6. The process as claimed in claim 1, wherein a molar ratio of $P_2O_5 : (NH_4)_xH_{3x}PO_4 = 1 : (0.3$ to $1)$ is used in the reaction mixture.

7. The process as claimed in claim 1, wherein 0.1 to 0.5 kg of urea per 1 kg of phosphorus pentoxide is admixed to the reaction mixture.

8. The process as claimed in claim 1, which is carried out in a kneader reactor.

9. The process as claimed in claim 8, wherein the heat removal surface areas of the kneader reactor are sized such that the reaction mixture is held at an end temperature of at most 300° C.

10. The process as claimed in claim 1, wherein the reaction mixture is preheated to an initial reaction temperature from 130 to 170° C.

11. The process as claimed in claim 10, wherein the reaction mixture is preheated to 140 to 160° C.

12. The process as claimed in claim 1, wherein up to 50% by weight of finished product is added to the reaction mixture.

13. The process as claimed in claim 1, wherein the heat treatment of the reaction material, after it has been comminuted to a mean particle size of from 50 to 200 µm, is carried out at temperatures from 200 to 300° C. under an ammonia atmosphere.

14. The process as claimed in claim 1, wherein the heat treatment is carried out in a rotary kiln.

* * * * *